Patented Sept. 10, 1940

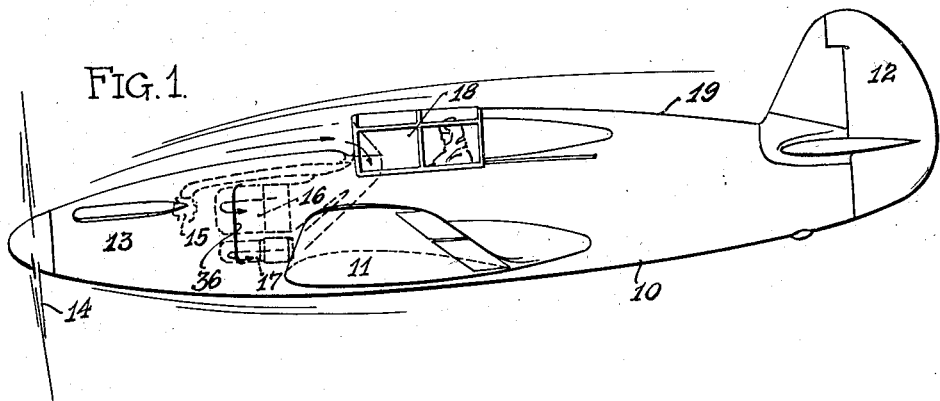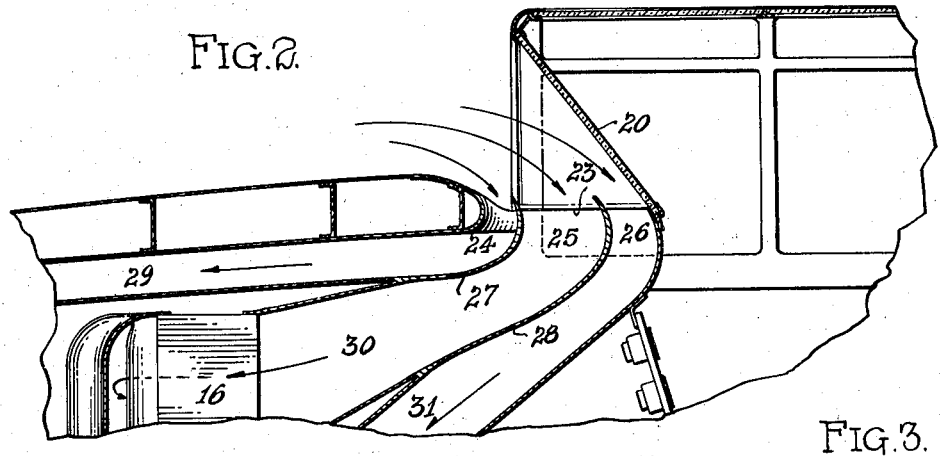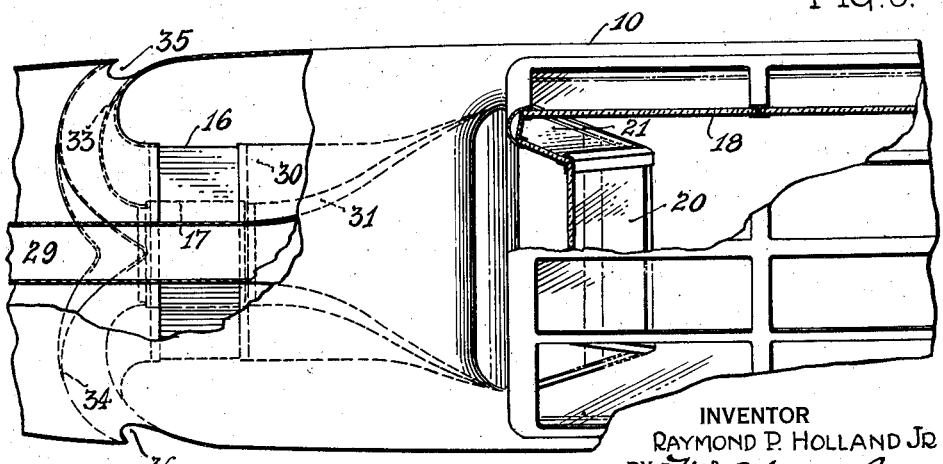

2,214,723

UNITED STATES PATENT OFFICE 2,214,723

WINDSHIELD AIR SCOOP

Raymond P. Holland, Jr., Tonawanda, N. Y., assignor to Curtiss-Wright Corporation, a corporation of Delaware Application August 25, 1938, Serial No. 226,661

5 Claims. (Cl. 244—57)

This invention relates to aircraft, being particularly concerned with improvements in a combination windshield and air scoop adapted for use in aircraft fuselages.

An object of the invention is to provide an improved intake air entrance in a fuselage for the purpose of feeding cool air to a power plant and auxiliaries, wherein the drag occasioned by the conventional air scoop arrangement is largely eliminated. A further object is to utilize a windshield of an aircraft cabin as a scoop, whereby the drag occasioned by the windshield is not increased and whereby the extra drag which would be occasioned by the use of additional scoops is done away with. Further objects of the invention will become apparent in reading the annexed description in connection with the drawing, in which:

Fig. 1 is a side elevation of an aircraft incorporating the invention;

Fig. 2 is a longitudinal section through a portion of the aircraft fuselage;

Fig. 3 is a plan, partly in sections, of a fuselage incorporating the invention.

In the figures, I show a fuselage 10 provided with the usual wings 11 and empennage 12 and having a power plant in the usual location designated by the number 13, the power plant driving a propeller 14 at the nose of the fuselage. It is well known that cool air is required for cooling the engine, for feed to the carburetor, and for additional cooling functions such as intercoolers and oil coolers. In dotted lines in Fig. 1, I show the engine carburetor at 15, an intercooler being represented at 16 and an oil cooler at 17, each of these elements requiring air. Above the top of the fuselage 10 a cabin closure 18 projects, the rearward part of the closure being faired as at 19 into the empennage 12. At the forward end of the closure 18, a transparent windshield 20 is located, the windshield slanting rearwardly and inwardly from the forwardmost edge of the cabin 18 to form an air scoop. The lateral edges of the cabin are likewise connected with the inwardly slanted transparencies 21 connected with the lateral edges of the windshield 20, thus completing a closed front end for the cabin while defining an effective scoop. The fuselage, just forward of and beneath the windshield 20 is provided with an opening 23 leading to the various mechanisms requiring cool air. For convenience, the opening 23 may be divided into several parts such as 24, 25 and 26, by curved vanes 27 and 28. The opening 24 connects by a conduit 29 with the carburetor 15, while the openings 25 and 26 respectively communicate through ducts 30 and 31 with the intercooler 16 and with the oil cooler 17. As the aircraft travels forwardly, the scoop formed by the windshield 20 tends to ram air into the several ducts, the air subsequently passing through the respective mechanisms and issuing at the fuselage sides through suitable louvres formed therein. As shown in Fig. 3, the air exit for the intercooler 16 may be divided, exit ducts 33 and 34 respectively conducting exit air to the right and left hand sides of the fuselage and delivering same into the external airstream through rearwardly facing slots 35 and 36. The air exit for the oil cooler may be arranged in the same manner. In addition to the provisions of air for the mechanisms mentioned, cooling air might be provided for the engine itself and intake air may be provided for a turbo-supercharger.

In the past, the usual practice has been to locate scoops in the surface of the fuselage or engine cowling each adapted to entrain air for a different mechanism. Each of these scoops made an increase in the total drag of the airplane and the windshield itself likewise constituted a source of drag. The principal gain accomplished by the provisions of this invention is to eliminate the scoops previously considered necessary with consequent elimination of the drag occasioned thereby. Air entering the scoop formed by the windshield 20 will furnish ample cooling, etc., while the drag of the windshield itself remains practically the same as it would be in a conventional installation.

The present invention is particularly adapted to single-motored aircraft, in which the normal location of the windshield is comparatively close to the engine accessories and other devices requiring cooling air. The forwardly directed ducts from the windshield scoop to the accessories remove the necessity of many of the odd shaped air ducts which previously have been necessary. For instance, in many installations, all air has been taken in from a point forward of the engine and ducts were located without the periphery of the engine so that the overall cross-sectional area of the fuselage in the region of the engine was increased. Accordingly, a further reduction in drag might be occasioned by the use of this invention by holding down the cross-sectional dimensions of the fuselage in the vicinity of the engine since all of the ducts approach the engine from the rear rather than from the front.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. In aircraft comprising a body having an air entrance opening therein, a transparent scoop element, comprising a windshield, extending forwardly and outwardly from the rearward edge of said opening, and transparent side panels secured at their rear edges to the lateral edges of said scoop element and at their inner edges to the body adjacent the lateral borders of said opening, the length of said side panels being substantially co-extensive with the length of said opening.

2. In aircraft comprising a body having an air entrance opening therein, a transparent scoop element, comprising a windshield, extending forwardly and outwardly from the rearward edge of said opening, and transparent side panels secured at their rear edges to the lateral edges of said scoop element and at their inner edges to the body adjacent the lateral borders of said opening, the length of said side panels being substantially co-extensive with the length of said opening and a cabin closure for said body terminating at its forward end at the forwardmost edges of said scoop element and side panels.

3. In aircraft, in combination, a body having a cockpit opening and having, immediately forward of said cockpit, an air intake opening; a partition defining said openings from one another; transparent cockpit covering comprising side panels extending from the forwardmost border of said air intake opening rearwardly along the cockpit edges, the leading edges of said panels extending substantially normally from the fuselage profile, a transparent windshield, secured to the edge of said partition, extending outwardly and forwardly therefrom to the outer forward corners of said side panels, and a top cockpit covering panel secured at its forward edge to the outer edge of the windshield and at its lateral edges to the outer edges of said side panels.

4. In aircraft comprising a body having an air entrance opening in its surface, a transparent scoop element, comprising a windshield, extending forwardly and outwardly from the rearward edge of said opening, transparent side panels whose leading edges are substantially normal to the body surface and extend from the body at points adjacent the forward and lateral borders of said opening and whose leading edges are forward of the lateral edges of said scoop, and means sealing the lateral edges of the scoop element to said side panels.

5. In aircraft, comprising a body having an air entrance opening in its surface and a cockpit opening rearward of the entrance opening, a cockpit closure comprising transparent side and top panels extending over and forwardly of the cockpit, said panel leading edges lying substantially in a transverse plane in which the forward edge of said air entrance opening lies, and a transparent windshield providing a forward wall for the cabin closure, having its bottom edge joined to the body between the entrance opening and cockpit rearward of said transverse plane, and its lateral and top edges joined to said side and top cabin panels respectively.

RAYMOND P. HOLLAND, Jr.